United States Patent [19]

Treybig et al.

[11] Patent Number: 5,015,511
[45] Date of Patent: May 14, 1991

[54] LINEAR LOW DENSITY ETHYLENE INTERPOLYMERS FOR INJECTION MOLDING

[75] Inventors: Duane S. Treybig, Lake Jackson; Wendy D. Harris, Angleton; Christopher J. Thomas, Lake Jackson, all of Tex.

[73] Assignee: The Dow Chemical Company, Midland, Mich.

[21] Appl. No.: 193,433

[22] Filed: May 12, 1988

[51] Int. Cl.$^5$ ............................................. B29D 22/00
[52] U.S. Cl. .................................. 428/34.1; 428/220; 428/500; 264/328.1
[58] Field of Search ....................... 428/500, 215, 34.1, 428/220; 264/328.1

[56] References Cited

U.S. PATENT DOCUMENTS

| | | | |
|---|---|---|---|
| 3,703,565 | 11/1972 | Hoblit et al. | 260/876 B |
| 4,076,698 | 2/1978 | Anderson | 526/348.6 |
| 4,230,831 | 10/1980 | Sakurai | 525/240 |
| 4,250,288 | 2/1981 | Lowery | 526/151 |
| 4,294,794 | 10/1981 | Lovell | 264/328.1 |
| 4,314,912 | 2/1982 | Lowery | 252/429 B |
| 4,390,677 | 6/1983 | Karol | 528/348.6 |
| 4,525,322 | 6/1985 | Page et al. | 264/531 |
| 4,536,550 | 8/1985 | Moriguchi et al. | 525/240 |
| 4,593,009 | 6/1986 | Nowlin | 502/107 |
| 4,612,300 | 9/1986 | Coleman | 502/113 |
| 4,672,096 | 6/1987 | Nowlin | 526/116 |

FOREIGN PATENT DOCUMENTS 246209 of 1986 Japan .
2160535 12/1985 United Kingdom .

OTHER PUBLICATIONS

*SPE Transaction*, Jul. 1984 "Why Do Plastics Stress--Crack"?, John B. Howard, pp. 217-223.
*ANTEC 86 Boston 1986*, SPE Conference Proceedings, pp. 140-144 "Upgrading Your Spiral Flow"... Test, Fritch.
*Materials & Methods*, Sep., 1956 pp. 94-98, "How To Pick the Right Polyethylene", E. T. Dardes & C. F. Hammer.
*Polymer Engineering & Science*, Oct. 1966, pp. 341-348, M W. Distribution & Envrionmental Stress Cracking of LPE, Herman et al.

Primary Examiner—Edith Buffalow
Attorney, Agent, or Firm—W. J. Lee; L. W. White

[57] ABSTRACT

Improved injection-molded LLDPE articles, especially those having a wall thickness in the range of about 0.15 mm to as much as 1.5 mm, are prepared using an LLDPE containing a sufficient amount of at least one $C_5$-$C_{12}$ 1-alkene copolymerized with the ethylene to provide a density in the range of 0.91 to 0.945 g/cc, a melt flwo rate in the range of 60 to 200 g/10 minutes, and an $I_{10}/I_2$ ratio of 7.2 to about 18. Articles such as lids and containers are prepared having improved properties.

21 Claims, 2 Drawing Sheets

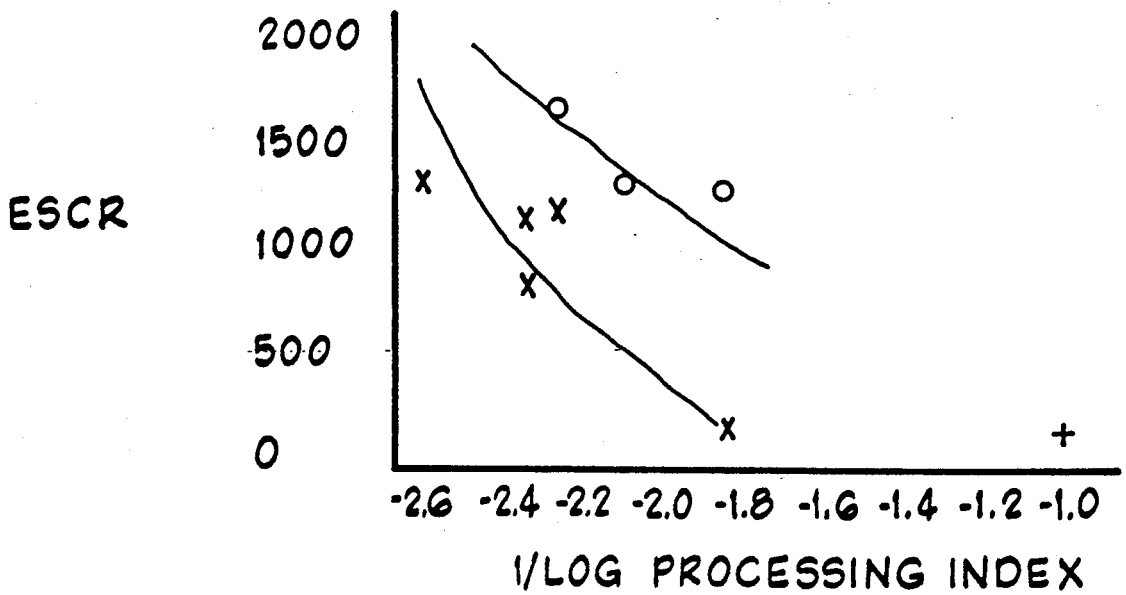

LINEAR LOW DENSITY ETHYLENE INTERPOLYMERS FOR INJECTION MOLDING

FIELD OF THE INVENTION

Certain ethylene interpolymers known as linear low density polyethylenes (LLDPE) having critical ranges of properties are used in injection moldings.

BACKGROUND OF THE INVENTION

Interpolymers prepared by copolymerizing ethylene with a minor amount of at least one alkene in the range of $C_3$–$C_{12}$, especially in the range of $C_5$–$C_9$, using a metal or coordination catalyst, such as those of the Ziegler-type, the Natta-type, or the Phillips-type, have become known as "linear low density polyethylene" (LLDPE); the "polyethylene" portion of the expression is actually an "interpolymer of ethylene", which is a particular form of a "copolymer of ethylene". The LLDPE copolymers in this disclosure are in contradistinction to the branched-chain low density polyethylene (LDPE) polymers and the linear high density polyethylene (HDPE) homopolymers which are well known in the art.

Various patents disclose catalysts and processes which produce LLDPE polymers with various amounts of ethylene/1-alkenes having various properties. Also disclosed are various reasons for attempting to achieve certain combinations of polymer properties for various end-uses.

Considering that the present invention, which is described in detail below, pertains to the unexpected discovery that certain critical properties are required in order to achieve the desired results, then it is believed that the most relevant prior art is that which is exemplified by the following publications:

U.S. Pat. No. 4,076,698 (Anderson et al) discloses the process of making linear low density ethylene/1-alkene copolymers using metal coordination catalysts, and demonstrates that the properties are different from the branched low density ethylene homopolymers made in a high pressure reactor using a free radical catalyst. It is also disclosed that the amount and size of the 1-alkene used in making the copolymer gives densities in the "low" range as opposed to the "high" densities obtained using metal coordination catalyst in making linear ethylene homopolymers. Anderson et al disclose that a polymer with a narrow molecular weight distribution (MWD) is necessary for the best environmental stress crack resistance. See, e.g. Anderson et al col. 11, lines 65–69 which discloses that stress crack resistance is improved by synthesizing a polymer with a narrow molecular weight distribution.

J. H. Herman et al in *Polymer Engineering Science* page 341, October, 1966 disclosed that narrowing the MWD at constant melt index improves the stress crack resistance of polymers.

U.S. Pat. Nos. 4,192,935 and 4,294,794 disclose interpolymer compositions having a density in the range of about 0.940–0.960, a melt index in the range of 100 to 200 grams/10 minutes and a ratio of weight-average molecular weight to number-average molecular weight of less than 5 for use in injection molding thin-wall containers: this represents a narrow molecular weight distribution.

U.S. Pat. Nos. 4,230,831 (col 1, lines 7–17); 4,525,322 (col 1, lines 11–23) and 4,617,352 (col. 1, lines 13–26) teach that it is well known that polymers having low molecular weight along with a narrow molecular weight distribution are suitable for articles molded by injection molding processes while blow molding processes require polymers having relatively high molecular weights and broad molecular weight distribution. Thus it is important to distinguish which type of molding process is being encountered.

U.S. Pat. Nos. 4,593,009 and 4,672,096 by Thomas E. Nowlin disclose catalytic processes for polymerizing alpha-olefins which yield LLDPE or HDPE of relatively broad molecular weight distribution, and disclose a Melt Index range of 0.1 to 50 grams/10 minutes. (An $I_{21}/I_2$ ratio in the range of about 90–240 for LLDPE is believed to correspond to an $I_{10}/I_2$ ratio in the range of about 19.8 to about 46.7.)

SUMMARY OF THE INVENTION

We have now found that improvements in the injection molding of articles (such as lids, containers, bottles, and the like, especially lids) from LLDPE are obtained by employing LLDPE which has properties and features within the following critical ranges:

amount of $C_5$–$C_{12}$ 1-alkene(s) in the interpolymer sufficient to produce the desired density, said amount generally being in the range of about 1% to about 15%, as measured by carbon-13 nuclear magnetic resonance (N.M.R.), depending on the length of the 1-alkene molecular chain:

Density in the range of 0.91 to 0.945 g/cc:

Melt flow rate (MFR) (also known as melt index (MI) when referring to ethylene homopolymers) in the range of about 60 to 200 g/10 min. as measured in accordance with ASTM D-1238, Condition 190/2.16;

Ratio of $I_{10}/I_2$ of 7.2 to 18.

The improvements are most pronounced when the wall thickness of the injection molded article is generally greater than about 0.15 mm., and may be as much as 1.5 mm or more, but is preferably not more than about 1.0 mm in thickness.

The interpolymers for use in the present invention have unimodal molecular weight distributions and are made by using a coordination catalyst such as a Ziegler-type or Phillips-type catalyst substantially as shown in U.S. Pat. Nos. 4,250,288 and 4,314,912.

FIGS. 1-4 are provided as visual aids in relating the present invention.

DETAILED DESCRIPTIONS INCLUDING BEST MODE KNOWN

In this disclosure, the expression "wall thickness" is used in deference to the fact that most of the injection-molded articles of interest in the present invention are containers of one kind or another that can be said to have "walls" which enclose the effective interior of the container, whether or not the container has an upper "wall" or lid completely enclosing the container. A lid on a tumbler-shaped or bowl-shaped container, whether it be a friction-fitted lid or not, is also considered here as being a "wall" so far as considering the thickness of the wall is concerned. The present invention is preferably and particularly useful in the making of various sizes of lids, such as the flanged snap-on lids used on food containers such as plastic bowls for butter, oleo-margarine, cottage cheese, and the like.

Throughout this disclosure, "melt flow rate, (MFR)", "melt index (MI)", and "$I_2$" are all measured in accordance with ASTM D-1238(190/2.16). "$I_{10}$" is measured in accordance with ASTM D-1238(190/10). Density is measured by ASTM D-792.

The polymers of the present invention are also characterized by the ratio of the weight-average molecular weight to the number-average molecular weight (Mw/Mn). Mw/Mn was determined by using gel permeation chromatography (GPC) at 145° C. with trichlorobenzene as the solvent, a flow-rate of 2 ml/min. and a refractive index as the detector. The column set consisted of three eighteen inch columns containing Styragel TM packing having pore sizes of about $10^4$, $10^5$ and $10^6$ Angstroms. The GPC method was calibrated by using polystyrene standards. The Mw/Mn of polymers of the present invention ranged from 6.7 to 14.6. ("Styragel" is a trademark of Waters Associates, Inc.)

The polymers of this invention exhibit a unimodal molecular weight distribution as determined by gel permeation chromatography. The unimodal molecular weight distribution may be skewed on the high molecular weight or low molecular weight side of the molecular weight distribution. FIG. 1 shows a typical unimodal molecular weight distribution of our invention which is skewed towards high molecular weight. FIG. 2 shows an example of a bimodal molecular weight distribution which is not an example of this invention.

In a general sense, the amount of the 1-alkene in the interpolymer is dependent on the particular 1-alkene(s) employed, the amount being that which produces the critical combination of MFR, ratio of $I_{10}/I_2$, and density. Preferably, the 1-alkene in the interpolymer is at least one of the group consisting of hexene, 4-methylpentene-1, and octene, most preferably octene. The percent of the 1-alkene in the interpolymer which produces the critical combination of properties is usually in the range of about 1 to 10, most usually about 3 to 8.

Regarding the critical properties, the preferred MFR is between 80 and 200 g/10 min., most preferably between 80 and 160 g/10 min., the preferred ratio of $I_{10}/I_2$ is at least 7.2, but less than 14, most preferably 7.2 to 10, and the density is most preferably between 0.925 and 0.940 g/cc.

The interpolymers used in the present invention in injection molded containers or lids exhibit an unpredicted increase in processability (as measured with spiral flow or the reciprocal of the log gas extrusion rheological processing index) at constant environmental stress crack resistance (ESCR) relative to the commercially available interpolymer compositions of which we are aware or such as those which are disclosed in U.S. Pat. Nos. 4,192,935 and 4,294,794. The present interpolymer compositions also exhibit an unpredicted improvement in environmental stress crack resistance when the processability is maintained constant relative to the commercially available interpolymer compositions that are referred to immediately above. Most of the commercially available LLDPE polymers of which we are aware generally have melt flow rates in the range of about 50 to 125 gms/10 minutes, $I_{10}/I_2$ ratios between 6.2–7.0 and densities in the range of about 0.915 to 0.930. U.S. Pat. Nos. 4,192,935 and 4,294,794 disclose interpolymer compositions having densities in the range of 0.94 to 0.96 gm/cc, melt flow rates in the range of 100–200 gms/10 minute and Mw/Mn ratios of less than 5 and the '794 patent claims the use of such polymers in the manufacture of containers having a wall thickness of less than 0.7 mm.

We have unexpectedly found that a plot of the environmental stress crack resistance as a function of the reciprocal of the log gas extrusion rheological processing index demonstrates, at a constant reciprocal of the log gas extrusion rheological index, that a LLDPE polymer with a broad molecular weight distribution has better environmental stress crack resistance than a LLDPE resin having a narrower molecular weight distribution. This relationship between environmental stress crack resistance, processing index and breadth of molecular weight distribution is something which we believe has not previously been disclosed, or even realized.

Furthermore we have found that the above-mentioned plot demonstrates, at a constant environmental stress crack resistance, that a LLDPE resin with a broad molecular distribution has a larger reciprocal of the log gas extrusion rheological processing index than a LLDPE polymer having a narrower molecular weight distribution.

Processability of the LLDPE polymers was measured by using spiral flow length measurements and the gas extrusion rheological processing index. Processability is a function of the molecular weight and breadth of the molecular weight distribution of a polymer. A polymer processes easier when the molecular weight is low and the breadth of molecular weight distribution is broad. Since melt index is inversely related to the weight-average molecular weight, then a polymer processes easier with a large melt index. A polymer processes harder when the molecular weight is high and the breadth of the molecular weight distribution is narrow. Spiral flow is directly related to processability whereas the gas extrusion rheological processing index is inversely related to processability. Therefore, a large spiral flow length and a small gas extrusion rheological processing index means that the polymer processes easily.

Spiral flow length measurements were performed by molding the LLDPE polymers on a Reed 150-Ton injection molding machine equipped with a 0.159 centimeters (1/16 inch) nozzle tip. The spiral flow mold used had a cross-sectional dimension of 0.556×0.318 centimeters (0.219×0.125 inches) and a maximum flow length of 228.6 centimeters (90 inches). The temperature profile across the barrel is shown in Table I.

TABLE I

| TEMPERATURE PROFILE ACROSS THE BARREL DURING SPIRAL FLOW LENGTH MEASUREMENTS | | | | |
|---|---|---|---|---|
| Nozzle | Front | Middle | Back | Rear |
| 475° F. | 500° F. | 500° F. | 500° F. | 450° F. |
| 246° C. | 260° C. | 260° C. | 260° C. | 246° C. |

All the conditions were held constant, except injection pressures. The pressures were varied from 400 to 800 pressure setting units which correspond to 48,262,600 to 162,027,800 dynes/cm$^2$ or 700 to 2350 psi. After each cm$^2$ pressure change, ten cycles were allowed to be completed before taking the next measurements. Ten specimens were taken at each pressure, measuring the spiral to the nearest 0.635 centimeter (0.25 inch). A mean and standard deviation were calculated from the ten values at each pressure setting. These data were used to generate linear plots which show the relative processability of each resin.

The rheological processing index is measured with a gas extrusion rheometer. The gas extrusion rheometer is described by M. Shida, R. N. Shroff and L. V. Cancio in Polymer Eng. Sci., Vol. 17, no. 11 (1977) on page 770 and in "Rheometers for Molten Plastics" by John M. Dealy, Van Nostrand Reinhold Co., 1982 on pp 97–99. The processing index is measured at a temperature of 190° C., at a nitrogen pressure of 1250 psi ($8.6185 \times 10^7$ dynes/cm$^2$) and with a 20:1 L/D die. The 20:1 L/D die has a capillary orifice diameter of 0.0292 inches (0.0742 cm) and a capillary length of 0.6 inches (1.524 cm). The gas extrusion rheological processing index (PI) in millipoise units is calculated from the following equation:

$$PI = 1.05 \times 10^6 \text{ dynes/cm}^2 / (1000 \times \text{shear rate}),$$

where $1.05 \times 10^6$ dynes/cm$^2$ is the shear stress at 1250 psi ($8.6185 \times 10^7$ dynes/cm$^2$) and the shear rate at the wall ($\gamma w$) is represented with the following equation $$\gamma w = 32 Q' / \pi (60 \text{ sec/min})(0.745)(\text{Dia} \times 2.54 \text{ cm/in})^3,$$

where Q' is the extrusion rate in grams/min. units, 0.745 is the density of polyethylene in the melt in gms/cm$^3$ and Dia is the orifice diameter (measured in inches) of the capillary.

The following described examples are for illustration purposes, but the invention is not limited to only the particular examples described.

Some of the LLDPE polymers were molded into lids on a Reed 150-Ton injection molding machine equipped with a two-cavity, single plate, hot-runner mold. The 502 lids which are 13.0175 centimeters in diameter had a panel thickness of 0.58 mm. The standard molding conditions used for each resin are summarized in Table II.

TABLE II

| 150 TON INJECTION MOLDING MACHINE RUN CONDITIONS WHEN USING 502 MOLD | |
|---|---|
| BARREL TEMP. | °F. |
| Nozzle Zone | 475 |
| Front Extension Zone | 500 |
| Front Zone | 500 |
| Center Zone | 500 |
| Rear Zone | 450 |
| Melt | 455–460 |
| TIMERS | SECONDS |
| Injection Standard | 1.0 |
| Injection Fast | 0.0 |
| Injection Hold | 0.0 |
| Screw Delay | 0.0 |
| Cure | 3.0 |
| Clamp Open | 0.5 |
| Cycle Time | 6.4 |
| CHILLER | DATA |
| Supply Temp. | 50° F. |
| Thermostat Temp. | 50° F. |
| Pump Pressure | +2,757,920 dynes/cm$^2$ (+40 psi) |
| PRESSURE SETTINGS | POTENTIOMETER SETTINGS |
| Low Close Pressure | 400 |
| Injection Hold Pressure | 775 |
| Injection Standard Pressure | 750 |
| Injection Fast Pressure | 800 |
| PRESSURE READINGS | DYNES/CM$^2$ (PSI) |
| Back Pressure | 3,447,400 (50) |

TABLE II-continued

| 150 TON INJECTION MOLDING MACHINE RUN CONDITIONS WHEN USING 502 MOLD | |
|---|---|
| CONTROL SETTINGS | POTENTIOMETER SETTINGS |
| Screw Stop | 090 |
| Injection Standard Speed | 2 |

Because the change of molding parameters (i.e. injection times, temperatures, pressures, total cycle times) influences the final properties that a molded lid possesses, the cycle time for each resin was not optimized, but rather the conditions were held constant so that the manufacturing variables would not interfere with the resin evaluations. To one skilled in the art of injection molding, all molding machines are known to be independent of each other. Therefore, these molding conditions cannot be construed as those standard to the industry.

The environmental stress crack resistance of the lids was determined from eighteen lids collected from cavity one for each resin. Each lid was inverted, folded and placed in a sample holder at a width of 4.445 centimeters. The lids and holders were submerged in CRISCO oil at room temperature. Failure was recorded as the time required for a crack to propagate from the edge of the rim to the gate. The time F50 in minutes, where half of the lids failed, was recorded.

The gull wing tear strength in units of grams of force per meter (gf/m) of the lids was determined according to ASTM D-1004. Specimens were cut from the panel of the lids made from each of the polymers of Table IV.

To confirm that processing index accurately represents processability, twenty-nine LLDPE polymers having melt flow rates from 23 to 121 grams/10 min., and $I_{10}/I_2$ ratios from 6.2 to 13.4, spiral flow length measurements at a pressure of $3.45 \times 10^7$ dynes/cm$^2$ (or 550 psi) were shown to be linearly and inversely related to the log gas extrusion rheological processing indexes measured at a shear stress of $1.05 \times 10^6$ dynes/cm$^2$. The relationship between the spiral flow length and log gas extrusion rheological processing index is represented by the following equation:

Spiral Flow Length = $-93.5319 \times$ Log Processing Index + 72.2735 where spiral flow length is expressed in centimeters and the processing index is expressed in millipoise. This relationship is illustrated in FIG. 3. In addition to the gas extrusion rheological processing index (PI) and spiral flow length for the twenty-nine LLDPE polymers, density, melt index and $I_{10}/I_2$ are summarized in Table III.

TABLE III

TWENTY-NINE LLDPE POLYMERS HAVING DENSITY FROM 0.908 TO 0.9325 GRAMS/CC, MELT FLOW RATES FROM 23 To 121 GRAMS/10 MINUTES AND $I_{10}/I_2$ RATIOS FROM 6.2 TO 13.4

| Resin | Density[a] | Melt Index[b] | $I_{10}/I_2$ | PI[c] | Spiral Flow Length[d] |
|---|---|---|---|---|---|
| A | 0.9183 | 23 | 7.5 | 1.38 | 62 |
| B | 0.9270 | 85 | 6.6 | 0.41 | 110 |
| C | 0.9317 | 98 | 6.2 | 0.38 | 115 |
| D | 0.9318 | 121 | 6.6 | 0.30 | 128 |
| E | 0.9280 | 46 | 7.1 | 0.71 | 83 |

TABLE III-continued
TWENTY-NINE LLDPE POLYMERS HAVING DENSITY FROM 0.908 TO 0.9325 GRAMS/CC, MELT FLOW RATES FROM 23 To 121 GRAMS/10 MINUTES AND $I_{10}/I_2$ RATIOS FROM 6.2 TO 13.4

| Resin | Density[a] | Melt Index[b] | $I_{10}/I_2$ | PI[c] | Spiral Flow Length[d] |
|---|---|---|---|---|---|
| F | 0.9325 | 91 | 7.0 | 0.35 | 114 |
| G | 0.9086 | 35 | 8.7 | 0.67 | 85 |
| H | 0.9097 | 29 | 7.6 | 1.04 | 71 |
| I | 0.9158 | 47 | 8.0 | 0.60 | 93 |
| J | 0.9165 | 88 | 8.3 | 0.26 | 129 |
| K | 0.9144 | 100 | 12.0 | 0.10 | 166 |
| L | 0.9320 | 83 | 13.4 | 0.13 | 152 |
| M | 0.9320 | 82 | 12.2 | 0.13 | 151 |
| N | 0.9302 | 82 | 7.9 | 0.31 | 118 |
| O | 0.9284 | 59 | 8.5 | 0.44 | 103 |
| P | 0.9292 | 60 | 8.0 | 0.47 | 110 |
| Q | 0.9292 | 64 | 7.7 | 0.44 | 103 |
| R | 0.9296 | 65 | 7.8 | 0.45 | 103 |
| S | 0.9296 | 64 | 7.3 | 0.46 | 102 |
| T | 0.9306 | 60 | 7.3 | 0.50 | 97 |
| U | 0.9310 | 75 | 7.2 | 0.41 | 108 |
| V | 0.9309 | 75 | 7.3 | 0.41 | 107 |
| W | 0.9309 | 77 | 7.4 | 0.41 | 110 |
| X | 0.9306 | 87 | 7.0 | 0.33 | 120 |
| Y | 0.9307 | 89 | 7.5 | 0.34 | 116 |
| Z | 0.9307 | 85 | 7.4 | 0.37 | 114 |
| AA | 0.9316 | 84 | 6.9 | 0.37 | 114 |
| AB | 0.9316 | 86 | 6.8 | 0.38 | 114 |
| AC | 0.9317 | 86 | 7.3 | 0.36 | 114 |

[a] Density units are grams per cubic centimeter.
[b] Melt index units are grams/10 minutes.
[c] PI is an abbreviation for the processing index obtained with the gas extrusion rheometer. PI was measured at a shear stress of $1.05 \times 10^6$ dynes/cm$^2$. The processing index units are millipoise.
[d] The spiral flow length was measured in units of centimeters at a pressure of 500 psi or $3.45 \times 10^7$ dynes/cm$^2$.

TABLE IV
CRISCO* Oil Environmental Stress Crack Resistance and Gull Wing Tear Strength of Ten LLDPE Ethylene/Octane Interpolymers

| Resin | ESCR $F_{50}$ (min.) | Gull Wing Tear (gf/m)** |
|---|---|---|
| B | 1280 | 884 |
| C | 896 | 895 |
| D | 311 | 870 |
| L[e] | 153 | 830 |
| M[e] | 150 | 830 |
| N[e] | 1207 | 888 |
| Y[e] | 1254 | 929 |
| Z[e] | 1615 | 929 |
| AA | 1164 | 939 |
| AB | 1131 | 949 |

[e] An example of this invention
*The word "CRISCO" is a trademark of Proctor & Gamble
**Gull Wing Tear Strength was measured in units of grams of force per meter (gf/m).

The invention is best illustrated by FIG. 4. FIG. 4 shows the relationship between the inverse of the log gas extrusion rheological processing index and the CRISCO oil environmental stress crack resistance for the ten LLDPE interpolymers in Table IV. In FIG. 4, the x's represent runs having $I_{10}/I_2$ ratios in the range of about 6.65±0.25, the o's represent runs having $I_{10}/I_2$ ratios of about 7.6±0.3 and the "+" on the graph represents 2 runs of $I_{10}/I_2$ ratios of about 12.8±0.6.

In FIG. 4, the CRISCO oil environmental stress crack resistance (ESCR) is shown by the diagonal line to decrease rapidly as the inverse of the log gas extrusion rheological processing index is increased for each group of interpolymers. Because the inverse of the log gas extrusion rheological processing index is directly related to the processing performance of the interpolymers, this shows that increased processability is achievable only with severe reductions in ESCR. This trend is consistent with the plot of melt flow index versus time-to-failure from an environmental stress crack resistance test on page 355 of "Fracture Behavior of Polymers," Elsevier Applied Science Publishers, 1983, by A. J. Kinlock and R. J. Young.

FIG. 4 shows that broadening the molecular weight distribution beyond an $I_{10}/I_2$ of 7.2 disrupts this trend by allowing the practitioner to achieve better ESCR at equivalent processability or achieve better processability at constant ESCR. As can be seen in the figure however, this effect diminishes somewhat as the molecular weight distribution increases beyond an $I_{10}/I_2$ of 12.

We claim:

1. In a process wherein LLDPE articles having wall thicknesses in the range of about 0.15 to about 1.5 mm are made by injection-molding of molten LLDPE, the improvement wherein the LLDPE is selected from those which have a sufficient amount of at least one copolymerized $C_5-C_{12}$ alpha-olefin to produce a density in the range of 0.91 to 0.945 gm/cc, a melt flow rate in the range of about 60 to 200 gms./10 minutes, an Mw/Mn ratio of from 6.7 to about 14.6, and an $I_{10}/I_2$ ratio of from 7.2 to about 18.

2. The process of claim 1 wherein the LLDPE has a melt flow rate which is in the range of 80 to 200 gms./10 minutes.

3. The process of claim 1 wherein the LLDPE contains a sufficient amount of hexene, 4-methyl pentene-1, and/or octene-1 copolymerized therein to produce a density in the range of 0.91 to 0.945 gm/cc.

4. The process of claim 1 wherein the alpha-olefin comprises octene-1.

5. The process of claim 1 wherein the LLDPE has an $I_{10}/I_2$ ratio of from 7.2 to 14.

6. The process of claim 1 wherein the LLDPE article comprises a container and a lid for a container.

7. The process of claim 1 wherein the LLDPE article is a lid for a container.

8. The process of claim 1 wherein the LLDPE article has wall thicknesses in the range of 0.15 to 1 mm.

9. The process of claim 1 wherein the injection-molded article has a thickness in the range between 0.15 and 1.5 mm and the LLDPE comprises an ethylene/octene-1 copolymer wherein the octene-1 is present in sufficient amounts to provide a density in the range of 0.915 to 0.94 gm/cc, said LLDPE being further characterized as one having a melt flow rate in the range of 80 to 160 gms/10 minutes, and an $I_{10}/I_2$ ratio in the range of 7.2 to 10.

10. The process of claim 1 wherein the injected molded article has a thickness in the range between 0.15 and 1.5 mm and the LLDPE comprises an ethylene/hexene-1 copolymer wherein the hexene-1 is present in sufficient amounts to provide a density in the range of 0.915 to 0.94 gm/cc, said LLDPE being further characterized as one having a melt flow rate in the range of 80 to 160 gms/10 minutes, and an $I_{10}/I_2$ ratio in the range of 7.2 to 10.

11. An injection-molded article having wall thickness in the range of about 0.15 to about 1.5 mm and being comprised of LLDPE having a polymer density in the range of 0.91 to 0.945 gm/cc, said LLDPE being an interpolymer of ethylene with at least one $C_5$–$C_{12}$ alpha-olefin, said LLDPE having a melt flow rate in the range of about 60 to 200 gms./10 minutes, an Mw/Mn ratio of from 6.7 to about 14.6, and having an $I_{10}/I_2$ ratio of from 7.2 to 18.

12. The article of claim 11 wherein said wall thickness is in the range of about 0.15 to 1 mm.

13. The article of claim 11 wherein the article is a container, a lid, or a container and lid.

14. The article of claim 11 wherein the density of the LLDPE is in the range of 0.91 to 0.94 gm/cc.

15. The article of claim 11 wherein the alpha-olefin is at least one of hexene-1, 4-methyl pentene-1, and octene-1.

16. The article of claim 11 wherein the alpha-olefin is octene-1.

17. The article of claim 11 wherein the alpha-olefin is hexene-1.

18. The article of claim 11 wherein the melt flow rate is in the range of 80 to 160.

19. The article of claim 11 wherein the $I_{10}/I_2$ ratio is in the range of 7.2 to 14.

20. The article of claim 11 wherein the $I_{10}/I_2$ ratio is in the range of 7.2 to 10.

21. The process of claim 1 wherein the LLDPE article is a container.

* * * * *